(12) United States Patent
Oliver

(10) Patent No.: US 8,805,995 B1
(45) Date of Patent: Aug. 12, 2014

(54) CAPTURING DATA RELATING TO A THREAT

(75) Inventor: Ian Oliver, Manly Vale (AU)

(73) Assignee: Symantec Corporation, Mountain View, CA (US)

( * ) Notice: Subject to any disclaimer, the term of this patent is extended or adjusted under 35 U.S.C. 154(b) by 418 days.

(21) Appl. No.: 12/472,086

(22) Filed: May 26, 2009

Related U.S. Application Data

(60) Provisional application No. 61/055,635, filed on May 23, 2008.

(51) Int. Cl.
G06F 15/173 (2006.01)

(52) U.S. Cl.
USPC ........................................................ 709/224

(58) Field of Classification Search
USPC ................................. 709/224–226
See application file for complete search history.

(56) References Cited

U.S. PATENT DOCUMENTS

| | | | | |
|---|---|---|---|---|
| 5,471,631 | A * | 11/1995 | Beardsley et al. | 713/502 |
| 5,964,839 | A * | 10/1999 | Johnson et al. | 709/224 |
| 6,324,647 | B1 * | 11/2001 | Bowman-Amuah | 726/23 |
| 6,370,573 | B1 * | 4/2002 | Bowman-Amuah | 709/223 |
| 6,473,000 | B1 * | 10/2002 | Secreet et al. | 340/936 |
| 6,473,794 | B1 * | 10/2002 | Guheen et al. | 709/223 |
| 6,536,037 | B1 * | 3/2003 | Guheen et al. | 717/151 |
| 6,615,166 | B1 * | 9/2003 | Guheen et al. | 703/27 |
| 6,701,345 | B1 * | 3/2004 | Carley et al. | 709/205 |
| 6,704,873 | B1 * | 3/2004 | Underwood | 726/12 |
| 6,704,874 | B1 * | 3/2004 | Porras et al. | 726/22 |
| 6,721,713 | B1 * | 4/2004 | Guheen et al. | 705/1.1 |
| 7,020,697 | B1 * | 3/2006 | Goodman et al. | 709/223 |
| 7,203,962 | B1 * | 4/2007 | Moran | 726/23 |
| 7,315,826 | B1 * | 1/2008 | Guheen et al. | 705/7.29 |
| 7,467,198 | B2 * | 12/2008 | Goodman et al. | 709/223 |
| 7,472,422 | B1 * | 12/2008 | Agbabian | 726/25 |
| 7,523,191 | B1 * | 4/2009 | Thomas et al. | 709/224 |
| 7,594,270 | B2 * | 9/2009 | Church et al. | 726/23 |
| 7,600,259 | B2 * | 10/2009 | Qi | 726/25 |
| 7,832,005 | B1 * | 11/2010 | Satish et al. | 726/22 |
| 7,870,203 | B2 * | 1/2011 | Judge et al. | 709/206 |
| 8,402,540 | B2 * | 3/2013 | Kapoor et al. | 726/23 |
| 8,468,244 | B2 * | 6/2013 | Redlich et al. | 709/225 |
| 2003/0005107 | A1 * | 1/2003 | Dulberg et al. | 709/223 |
| 2003/0051026 | A1 * | 3/2003 | Carter et al. | 709/224 |
| 2004/0034794 | A1 * | 2/2004 | Mayer et al. | 713/200 |
| 2004/0260947 | A1 * | 12/2004 | Brady et al. | 713/201 |
| 2005/0120273 | A1 * | 6/2005 | Hudson et al. | 714/38 |
| 2006/0059253 | A1 * | 3/2006 | Goodman et al. | 709/223 |

(Continued)

*Primary Examiner* — Rupal Dharia
*Assistant Examiner* — Marcus McKenzie
(74) *Attorney, Agent, or Firm* — Holland & Hart LLP

(57) ABSTRACT

A method of capturing data relating to a threat in a server processing system is described. Event history data that comprises a sequential chain of one or more events performed by a client processing system is received. Performance of the one or more events in the chain leads to a trigger event. The trigger event that occurred in the client processing system is also received. The server processing system receives the event history data in response to the client processing system detecting the trigger event. The events in the chain are analyzed in a reverse order to determine a starting point for the chain of events. The event history data is compared against past event history data received from a plurality of client processing systems in order to determine if the event history data and the past event history data comprise a series of common events. An entity associated with the series of common events is identified.

20 Claims, 4 Drawing Sheets

(56) References Cited

U.S. PATENT DOCUMENTS

| | | | |
|---|---|---|---|
| 2006/0259593 A2* | 11/2006 | Oliphant | 709/220 |
| 2007/0027992 A1* | 2/2007 | Judge et al. | 709/227 |
| 2007/0061487 A1* | 3/2007 | Moore et al. | 709/246 |
| 2007/0250818 A1* | 10/2007 | Boney | 717/124 |
| 2007/0261112 A1* | 11/2007 | Todd et al. | 726/11 |
| 2008/0028469 A1* | 1/2008 | Repasi et al. | 726/24 |
| 2008/0066180 A1* | 3/2008 | Repasi et al. | 726/24 |
| 2008/0072325 A1* | 3/2008 | Repasi et al. | 726/23 |
| 2008/0086775 A1* | 4/2008 | Repasi et al. | 726/24 |
| 2008/0168135 A1* | 7/2008 | Redlich et al. | 709/204 |
| 2008/0177994 A1* | 7/2008 | Mayer | 713/2 |
| 2008/0313282 A1* | 12/2008 | Warila et al. | 709/206 |
| 2009/0044024 A1* | 2/2009 | Oberheide et al. | 713/188 |
| 2009/0077383 A1* | 3/2009 | de Monseignat et al. | 713/175 |
| 2009/0125632 A1* | 5/2009 | Purpura | 709/229 |
| 2009/0254572 A1* | 10/2009 | Redlich et al. | 707/10 |
| 2010/0102982 A1* | 4/2010 | Hoveida | 340/691.3 |
| 2010/0250497 A1* | 9/2010 | Redlich et al. | 707/661 |
| 2010/0274869 A1* | 10/2010 | Warila et al. | 709/217 |
| 2010/0313268 A1* | 12/2010 | Abdulhayoglu et al. | 726/24 |
| 2011/0213869 A1* | 9/2011 | Korsunsky et al. | 709/223 |
| 2011/0231510 A1* | 9/2011 | Korsunsky et al. | 709/213 |
| 2011/0231564 A1* | 9/2011 | Korsunsky et al. | 709/231 |
| 2011/0238855 A1* | 9/2011 | Korsunsky et al. | 709/231 |

* cited by examiner

CAPTURING DATA RELATING TO A THREAT

RELATED APPLICATIONS

This application is related and claims priority to U.S. Application No. 61/055,635 filed 23 May 2008 and titled CAPTURING DATA RELATING TO A THREAT.

TECHNICAL FIELD

The present invention generally relates to the field of computing and more particularly to a method, system, computer readable medium of instructions and/or computer program product capturing data relating to a threat.

BACKGROUND ART

There has been a significant rise in threats which can lead to a processing system being infected with malware. One solution to this problem is the use of software which attempts to detect when a threat occurs in a processing system and to restrict the threat from performing malicious steps in the processing system. However, the drawback to such software is that it must be configured to detect the specific threat. If the threat is slightly varied by a malware author, the software may be unable to detect the threat and thus leave the processing system open to attack.

One solution to this drawback has been to collect information about the source of a threat and to then warn or block a user of the processing system from being exposed to the source of the threat. One implementation to this solution has been the use of "honeyclients" to perform a crawling analysis of entities such as webpages and the like so as to collect information about threats, wherein the results of the analysis are provided to users in order to avoid visiting particular malicious websites and the like.

However, this form of analysis is highly resource intensive, particularly due to the number of webpages that now exist on the Internet and the crawling technique which this solution implements. Additionally, the results of the analysis can be outdated. For example, a particular malicious webpage may be configured to modify the malicious portion of the website within a few hours or less. In such a situation, the honeyclient may perform an analysis of the website in a period of time when the malicious portion of the website has been removed, thereby avoiding detection by the honeyclient. Therefore, such a system is difficult, if not impossible, to implement accurately due to the high variation that occurs with threats, particularly on such a short time scale.

Therefore, there is a need for a method, system and computer program product which enables data to be captured relating to a threat which overcomes or ameliorates one or more of the above-mentioned problems.

As used herein a "threat" includes malicious software, also known as "malware" or "pestware", which includes software that is included or inserted in a part of a processing system for a harmful purpose. The term threat should be read to include possible, potential and actual threats. Types of malware can include, but are not limited to, malicious libraries, viruses, worms, Trojans, adware, malicious active content and denial of service attacks. In the case of invasion of privacy for the purposes of fraud or theft of identity, malicious software that passively observes the use of a computer is known as "spyware".

A hook (also known as a hook procedure or hook function) generally refers to a function provided by a software application that receives certain data before the normal or intended recipient of the data. A hook function can thus examine or modify certain data before passing on the data. Therefore, a hook function allows a software application to examine data before the data is passed to the intended recipient.

An API ("Application Programming Interface") hook (also known as an API interception), a type of hook, refers to a callback function provided by an application that replaces functionality provided by an operating system's API. An API generally refers to an interface that is defined in terms of a set of functions and procedures, and enables a program to gain access to facilities within an application. An API hook can be inserted between an API call and an API procedure to examine or modify function parameters before passing parameters on to an actual or intended function. An API hook may also choose not to pass on certain types of requests to an actual or intended function.

A process is at least one of a running software program or other computing operation, or a part of a running software program or other computing operation, that performs a task.

A hook chain is a list of pointers to special, application-defined callback functions called hook procedures. When a message occurs that is associated with a particular type of hook, the operating system passes the message to each hook procedure referenced in the hook chain, one after the other. The action of a hook procedure can depend on the type of hook involved. For example, the hook procedures for some types of hooks can only monitor messages, others can modify messages or stop their progress through the chain, restricting them from reaching the next hook procedure or a destination window.

A kernel refers to the core part of an operating system, responsible for resource allocation, low-level hardware interfaces, security, etc.

An interrupt is at least one of a signal to a processing system that stops the execution of a running program so that another action can be performed, or a circuit that conveys a signal stopping the execution of a running program.

A system registry is a database used by modern operating systems, for example Windows™ platforms. The system registry includes information needed to configure the operating system. The operating system refers to the registry for information ranging from user profiles, to which applications are installed on the machine, to what hardware is installed and which ports are registered.

A hash function (i.e. Message Digest, eg. MD5) can be used for many purposes, for example to establish whether a file transmitted over a network has been tampered with or contains transmission errors. A hash function uses a mathematical rule which, when applied to a file, generates a hash value, i.e. a number, usually between 128 and 512 bits in length. This number is then transmitted with the file to a recipient who can reapply the mathematical rule to the file and compare the resulting number with the original number.

An entity can include, but is not limited to, a file, an object, a class, a collection of grouped data, a library, a variable, a process, and/or a device.

In a networked information or data communications system, a user has access to one or more terminals which are capable of requesting and/or receiving information or data from local or remote information sources. In such a communications system, a terminal may be a type of processing system, computer or computerised device, personal computer (PC), mobile, cellular or satellite telephone, mobile data terminal, portable computer, Personal Digital Assistant (PDA), pager, thin client, or any other similar type of digital electronic device. The capability of such a terminal to request and/or receive information or data can be provided by software, hardware and/or firmware. A terminal may include or be associated with other devices, for example a local data storage device such as a hard disk drive or solid state drive.

An information source can include a server, or any type of terminal, that may be associated with one or more storage devices that are able to store information or data, for example in one or more databases residing on a storage device. The exchange of information (i.e. the request and/or receipt of information or data) between a terminal and an information source, or other terminal(s), is facilitated by a communication means. The communication means can be realised by physical cables, for example a metallic cable such as a telephone line, semi-conducting cables, electromagnetic signals, for example radio-frequency signals or infra-red signals, optical fibre cables, satellite links or any other such medium or combination thereof connected to a network infrastructure.

The reference in this specification to any prior publication (or information derived from the prior publication), or to any matter which is known, is not, and should not be taken as an acknowledgment or admission or any form of suggestion that the prior publication (or information derived from the prior publication) or known matter forms part of the common general knowledge in the field of endeavour to which this specification relates.

SUMMARY

In one broad aspect there is provided a method of capturing data relating to a threat, wherein the method includes, in a server processing system:

receiving event history data indicative of one or more events performed by a client processing system and a trigger event that occurred in the client processing system, wherein the server processing system receives the event history data in response to the client processing system detecting the trigger event; and analysing the event history data against past event history data received from a plurality of client processing systems in order to determine if a threat attempted to compromise the client processing system, and identify an exploit utilised by the threat in attempting to compromise the client processing system.

In one form, the method includes, in the server processing system:

comparing the event history data against the past event history data to determine a series of common events;

determining, using the series of common events, a series of disseminating processing systems associated with issuing the series of common events for disseminating the threat;

transferring data indicative of a blacklist to the plurality of client processing systems to restrict events being executed by the plurality of client processing systems which originate from the series of disseminating processing systems.

In another form, the method includes, in the server processing system:

comparing one or more events recorded in the event history data against one or more events recorded in the past history data to identify an uncommon event associated with event history data, wherein the identification of the uncommon event is indicative of an unknown exploit for compromising one of the client processing systems with the threat; and transferring hook data to the plurality of processing systems, wherein the hook data, when executed by the plurality of processing systems, intercepts a request to perform the uncommon event and detects the request to perform the uncommon event as a trigger event.

In an embodiment, the method includes, in the server processing system, filtering the event history data based upon the trigger event detected by the client processing system in order to disregard events recorded which were performed by the client processing system which were independent of the trigger event.

In another broad aspect there is provided a server processing system configured to capture data relating to a threat, wherein the server processing system is configured to:

receive event history data indicative of one or more events performed by a client processing system and a trigger event that occurred in the client processing system, wherein the server processing system receives the event history data in response to the client processing system detecting the trigger event; and analyse the event history data against past event history data received from a plurality of client processing systems in order to determine if a threat attempted to compromise the client processing system, and identify an exploit utilised by the threat in attempting to compromise the client processing system.

In one form, the server processing system is configured to:

compare the event history data against the past event history data to determine a series of common events;

determine, using the series of common events, a series of disseminating processing systems associated with issuing the series of common events for disseminating the threat;

transfer data indicative of a blacklist to the plurality of client processing systems to restrict events being executed by the plurality of client processing systems which originate from the series of disseminating processing systems.

In another form, the server processing system is configured to:

compare one or more events recorded in the event history data against one or more events recorded in the past history data to identify an uncommon event associated with event history data, wherein the identification of the uncommon event is indicative of an unknown exploit for compromising one of the client processing systems with the threat; and transfer hook data to the plurality of processing systems, wherein the hook data, when executed by the plurality of processing systems, intercepts a request to perform the uncommon event and detects the request to perform the uncommon event as a trigger event.

In an embodiment, the server processing system is configured to filter the event history data based upon the trigger event detected by the client processing system in order to disregard events recorded which were performed by the client processing system which were independent of the trigger event.

In another broad aspect there is provided a computer program product including a computer readable medium having a computer program recorded therein or thereon, the computer program enabling data to be captured about a threat, wherein the computer program product configures a server processing system to:

receive event history data indicative of one or more events performed by a client processing system and a trigger event that occurred in the client processing system, wherein the server processing system receives the event history data in response to the client processing system detecting the trigger event; and analyse the event history data against past event history data received from a plurality of client processing systems in order to determine if a threat attempted to compromise the client processing system, and identify an exploit utilised by the threat in attempting to compromise the client processing system.

In one form, the computer program product configures the server processing system to:

compare the event history data against the past event history data to determine a series of common events;

determine, using the series of common events, a series of disseminating processing systems associated with issuing the series of common events for disseminating the threat;

transfer data indicative of a blacklist to the plurality of client processing systems to restrict events being executed by the plurality of client processing systems which originate from the series of disseminating processing systems.

In another form, the computer program product configures the server processing system to:

compare one or more events recorded in the event history data against one or more events recorded in the past history data to identify an uncommon event associated with event history data, wherein the identification of the uncommon event is indicative of an unknown exploit for compromising one of the client processing systems with the threat; and transfer hook data to the plurality of processing systems, wherein the hook data, when executed by the plurality of processing systems, intercepts a request to perform the uncommon event and detects the request to perform the uncommon event as a trigger event.

In another broad aspect there is provided a method of capturing data relating to a threat, wherein the method includes, in a client processing system:

recording event history data indicative of one or more events performed by the client processing system;

detecting a trigger event in the client processing system;

in response to detecting the trigger event, transferring the event history data to a server processing system, wherein the server processing system analyses the event history data against past event history data received from a plurality of client processing systems in order to determine if a threat attempted to compromise the client processing system, and identify an exploit utilised by the threat in attempting to compromise the client processing system.

In one form, the method includes, in the client processing system, receiving data indicative of the blacklist from the server processing system in order to restrict events being executed by the client processing system which originate from a series of disseminating processing systems which disseminate the threat.

In another form, the method includes, in the client processing system, receiving hook data from the server processing system, wherein execution of the hook data by the client processing system configures the client processing system to intercept a request to perform an uncommon event identified by the server processing system as an unknown exploit, wherein the client processing system detects the request to perform the uncommon event as a trigger event using the hook data.

In another broad aspect there is provided a client processing system configured to capture data relating to a threat, wherein the client processing system is configured to:

record event history data indicative of one or more events performed by the client processing system;

detect a trigger event in the client processing system;

in response to detecting the trigger event, transfer the event history data to a server processing system, wherein the server processing system analyses the event history data against past event history data received from a plurality of client processing systems in order to determine if a threat attempted to compromise the client processing system, and identify an exploit utilised by the threat in attempting to compromise the client processing system.

In one form, the client processing system is configured to receive data indicative of the blacklist from the server processing system in order to restrict events being executed by the client processing system which originate from a series of disseminating processing systems which disseminate the threat.

In another form, the client processing system is configured to receive hook data from the server processing system, wherein execution of the hook data by the client processing system configures the client processing system to intercept a request to perform an uncommon event identified by the server processing system as an unknown exploit, wherein the client processing system detects the request to perform the uncommon event as a trigger event using the hook data.

In another broad aspect there is provided a computer program product including a computer readable medium having a computer program recorded therein or thereon, the computer program enabling data to be captured about a threat, wherein the computer program product configures a client processing system to:

record event history data indicative of one or more events performed by the client processing system;

detect a trigger event in the client processing system;

in response to detecting the trigger event, transfer the event history data to a server processing system, wherein the server processing system analyses the event history data against past event history data received from a plurality of client processing systems in order to determine if a threat attempted to compromise the client processing system, and identify an exploit utilised by the threat in attempting to compromise the client processing system.

In one form, the computer program configures the client processing system to receive data indicative of the blacklist from the server processing system in order to restrict events being executed by the client processing system which originate from a series of disseminating processing systems which disseminate the threat.

In another form, the computer program configures the client processing system to receive hook data from the server processing system, wherein execution of the hook data by the client processing system configures the client processing system to intercept a request to perform an uncommon event identified by the server processing system as an unknown exploit, wherein the client processing system detects the request to perform the uncommon event as a trigger event using the hook data.

BRIEF DESCRIPTION OF FIGURES

Example embodiments should become apparent from the following description, which is given by way of example only, of a preferred but non-limiting embodiment, described in connection with the accompanying figures.

DESCRIPTION OF PREFERRED EMBODIMENTS

Figure 1:
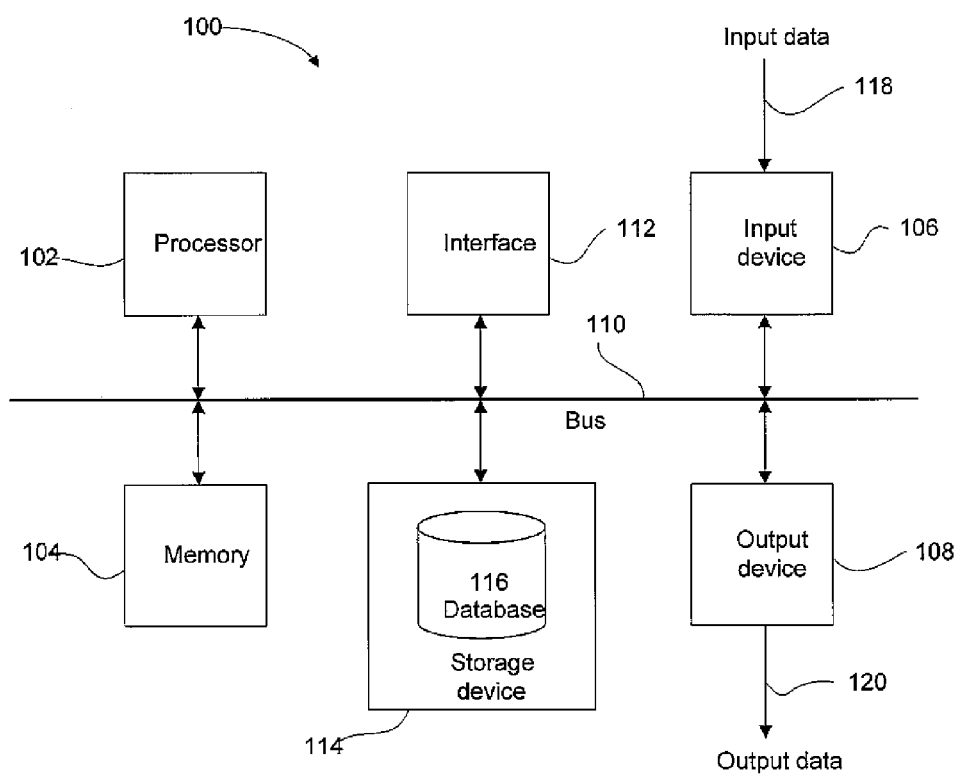
FIG. 1 illustrates a functional block diagram of an example processing system that can be utilised to embody or give effect to a particular embodiment.

The following modes, given by way of example only, are described in order to provide a more precise understanding of the subject matter of a preferred embodiment or embodiments.

In the figures, incorporated to illustrate features of an example embodiment, like reference numerals are used to identify like parts throughout the figures.

A particular embodiment of the present invention can be realised using a processing system, an example of which is shown in FIG. 1. In particular, the processing system 100 generally includes at least one processor 102, or processing unit or plurality of processors, memory 104, at least one input device 106 and at least one output device 108, coupled together via a bus or group of buses 110. In certain embodiments, input device 106 and output device 108 could be the same device. An interface 112 can also be provided for coupling the processing system 100 to one or more peripheral devices, for example interface 112 could be a PCI card or PC card. At least one storage device 114 which houses at least one database 116 can also be provided. The memory 104 can be any form of memory device, for example, volatile or non-volatile memory, solid state storage devices, magnetic devices, etc. The processor 102 could include more than one distinct processing device, for example to handle different functions within the processing system 100.

Input device 106 receives input data 118 and can include, for example, a keyboard, a pointer device such as a pen-like device or a mouse, audio receiving device for voice controlled activation such as a microphone, data receiver or antenna such as a modem or wireless data adaptor, data acquisition card, etc. Input data 118 could come from different sources, for example keyboard instructions in conjunction with data received via a network. Output device 108 produces or generates output data 120 and can include, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

In a particular embodiment, input data 118 can be a downloaded file or entity and output data 120 can be the identified network location and the physical location of an entity of interest transmitted to a remote processing system.

In use, the processing system 100 is adapted to allow data or information to be stored in and/or retrieved from, via wired or wireless communication means, the at least one database 116. The interface 112 may allow wired and/or wireless communication between the processing unit 102 and peripheral components that may serve a specialised purpose. More than one input device 106 and/or output device 108 can be provided. It should be appreciated that the processing system 100 may be any form of terminal, server, specialised hardware, or the like.

The processing system 100 may be a part of a networked communications system. Processing system 100 could connect to a network, for example the Internet or a WAN. Input data 118 and output data 120 could be received from or communicated to other devices, such as a server, via the network. The network may form part of, or be connected to, the Internet, and may be or form part of other communication networks, such as LAN, WAN, ethernet, token ring, FDDI ring, star, etc., networks, or mobile telephone networks, such as GSM, CDMA or 3G, etc., networks, and may be wholly or partially wired, including for example optical fibre, or wireless networks, depending on a particular implementation.

Figure 2:
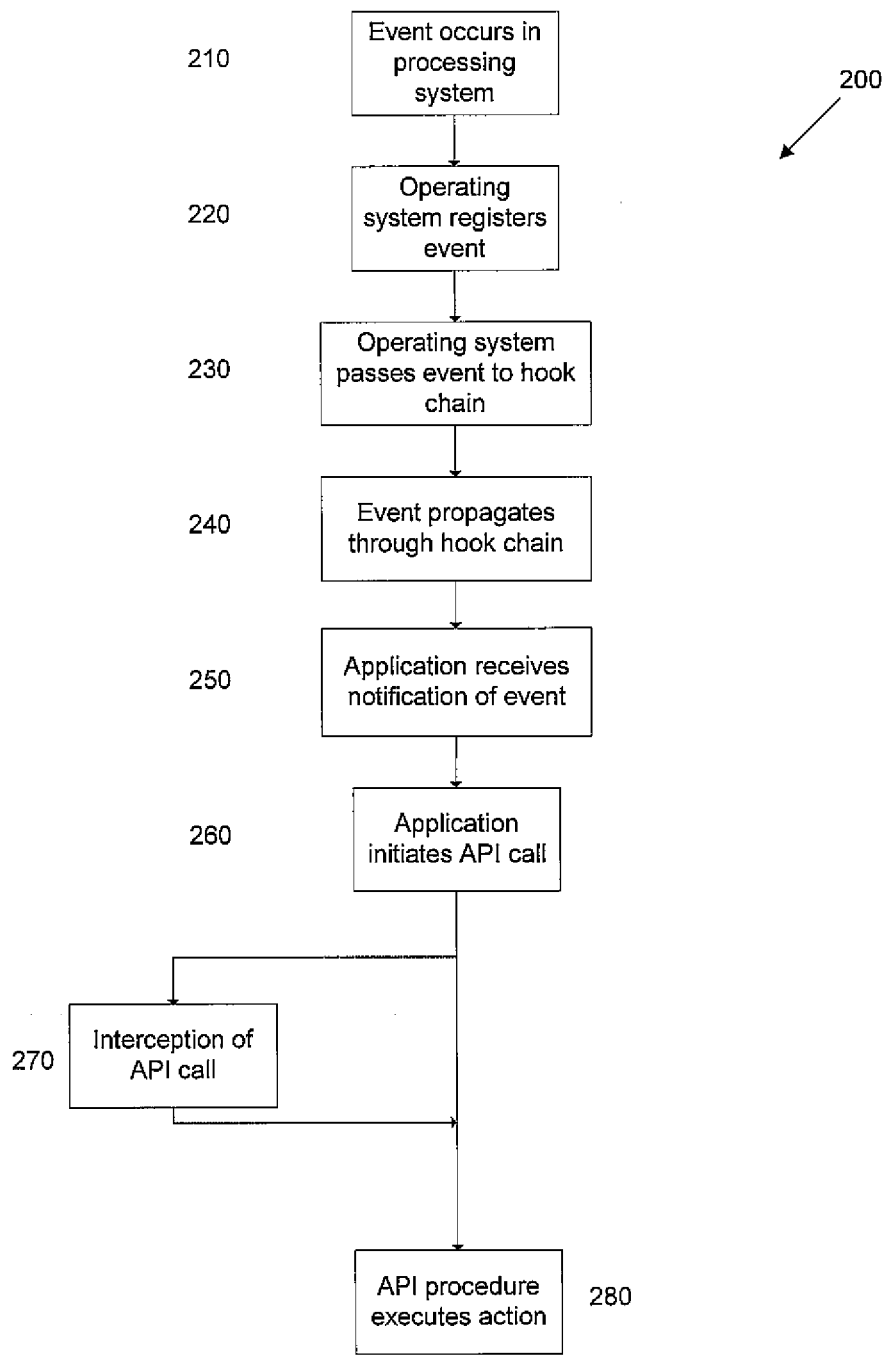
FIG. 2 is a flow diagram illustrating an example of interception.

Referring to FIG. 2 there is shown an example of a method 200 of intercepting activity in a processing system 100.

At step 210, an event occurs in the processing system 100. At step 220, an operating system running in the processing system 100 registers the occurrence of the event. At step 230, the operating system passes the registered event to the hook chain. At step 240, the event is passed to each hook in the hook chain such that different applications, processes, and devices may be notified of the registered event. Once the event has propagated throughout the hook chain, the method 200 includes at step 250 an application receiving notification of the event being registered by the processing system 100.

At step 260, the method 200 includes the application initiating an API call to an API procedure so as to carry out a response to the registered event. If an API hook has been established between the API call and the API procedure, the API call is intercepted before it reaches the API procedure at step 270. Processing can be performed by an API hook function once the API call has been intercepted prior to the API procedure being called. The API call may be allowed to continue calling the API procedure at step 280.

Figure 3:
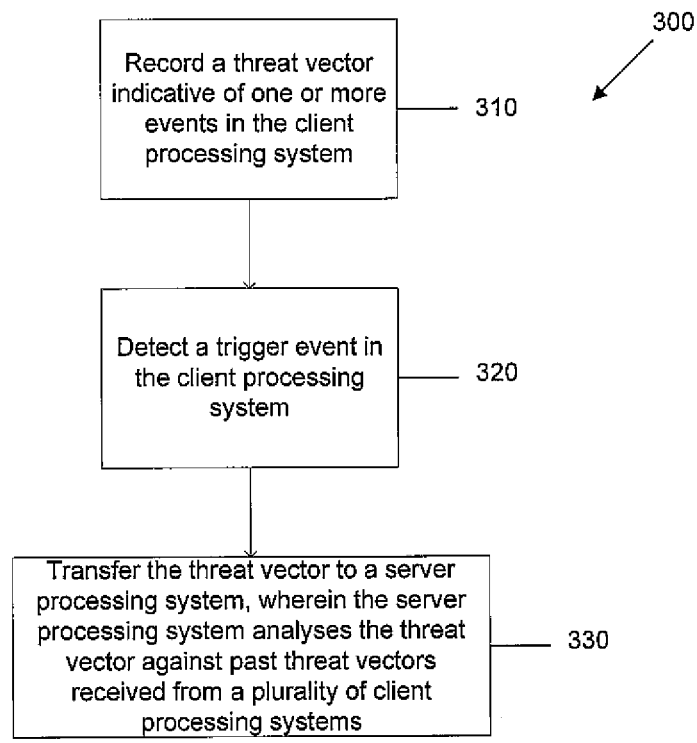
FIG. 3 illustrates a flow diagram illustrating an example method performed by a client processing system of capturing data relating to a threat.

Referring to FIG. 3, there is shown an example method performed by a client processing system for capturing data relating to a threat. In particular, at step 310, the method 300 includes recording event history data indicative of one or more events performed by the client processing system. At step 320, the method 300 detecting a trigger event in the client processing system. At step 330, the method includes, in response to detecting the trigger event, transferring the event history data to a server processing system, wherein the server processing system analyses the event history data against past event history data received from a plurality of client processing systems in order to determine if a threat attempted to compromise the client processing system, and identify an exploit utilised by the threat in attempting to compromise the client processing system.

Similarly, the method 300 can be performed by a client processing system based upon architecture of processing system 100. In particular, the client processing system is configured to: record event history data indicative of one or more events performed by the client processing system; detect a trigger event in the client processing system; and in response to detecting the trigger event, transfer the event history data to a server processing system, wherein the server processing system analyses the event history data against past event history data received from a plurality of client processing systems in order to determine if a threat attempted to compromise the client processing system, and identify an exploit utilised by the threat in attempting to compromise the client processing system.

Figure 4:
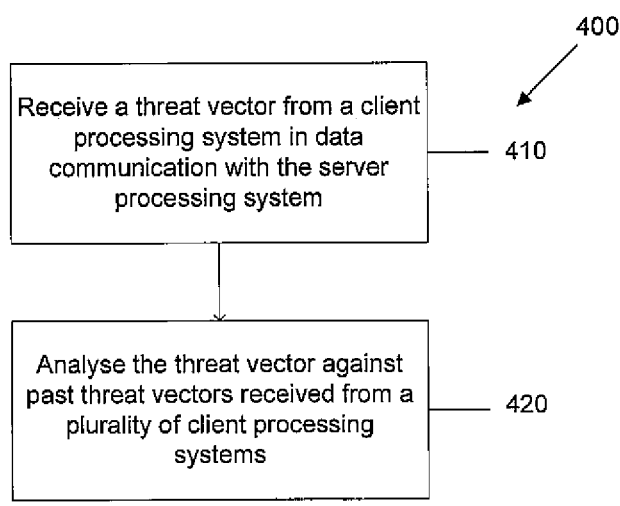
FIG. 4 illustrates a flow diagram illustrating an example method performed by a server processing system of capturing data relating to a threat.

Referring to FIG. 4, there is shown an example method performed by the server processing system for capturing data relating to a threat. In particular, at step 410, the method 400 includes receiving event history data indicative of one or more events performed by a client processing system and a trigger event that occurred in the client processing system, wherein the server processing system receives the event history data in response to the client processing system detecting the trigger event. At step 420, the method 400 includes analysing the event history data against past event history data received from a plurality of client processing systems in order to determine if a threat attempted to compromise the client processing system, and identify an exploit utilised by the threat in attempting to compromise the client processing system.

Similarly, the method 400 can be performed by a server processing system using architecture based upon of processing system 100. In particular, the server processing system is configured to: receive event history data indicative of one or more events performed by a client processing system and a trigger event that occurred in the client processing system, wherein the server processing system receives the event history data in response to the client processing system detecting the trigger event; and analyse the event history data against past event history data received from a plurality of client processing systems in order to determine if a threat attempted to compromise the client processing system, and identify an exploit utilised by the threat in attempting to compromise the client processing system.

The method of capturing data relating to a threat can be generally implemented using software which is executed by the client processing system and/or the server processing system, such as one or more application programs executing within the computer system 100.

In particular, the methods and processes are affected by instructions in the software that are carried out by the computer. The instructions may be formed as one or more code modules, each for performing one or more particular tasks. Typically the execution of the instructions may require a number of different application programs to interact, and may also require the presence of a suitable drivers or the like.

The software may be stored in a computer readable medium, and loaded into the computer, from the computer readable medium, to allow execution. A computer readable medium having such software or computer program recorded on it is a computer program product.

In one form there can be provided a computer program product including a computer readable medium having a computer program recorded therein or thereon, the computer program enabling data to be captured about a threat, wherein the computer program product configures a client processing system to: record event history data indicative of one or more events performed by the client processing system; detect a trigger event in the client processing system; and in response to detecting the trigger event, transfer the event history data to a server processing system, wherein the server processing system analyses the event history data against past event history data received from a plurality of client processing systems in order to determine if a threat attempted to compromise the client processing system, and identify an exploit utilised by the threat in attempting to compromise the client processing system.

Additionally or alternatively, there can be provided a computer program product including a computer readable medium having a computer program recorded therein or thereon, the computer program enabling data to be captured about a threat, wherein the computer program product configures a server processing system to: receive event history data indicative of one or more events performed by a client processing system and a trigger event that occurred in the client processing system, wherein the server processing system receives the event history data in response to the client processing system detecting the trigger event; and analyse the event history data against past event history data received from a plurality of client processing systems in order to determine if a threat attempted to compromise the client processing system, and identify an exploit utilised by the threat in attempting to compromise the client processing system.

The term "computer readable medium" as used herein refers to any storage or transmission medium that participates in providing instructions and/or data to the computer system 100 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the processing system 100. Examples of transmission media include radio or infra-red transmission channels as well as a network connection to another computer or networked device, and the Internet or Intranets including e-mail transmissions and information recorded on Websites and the like.

The event history data can be stored in a variety of data structures. In one particular form, the event history data can be stored in the form of a vector, which is herein referred to as a threat vector. However, it will be appreciated that other forms of data structures can also be used for storing the events executed by the client processing system.

Figure 5:
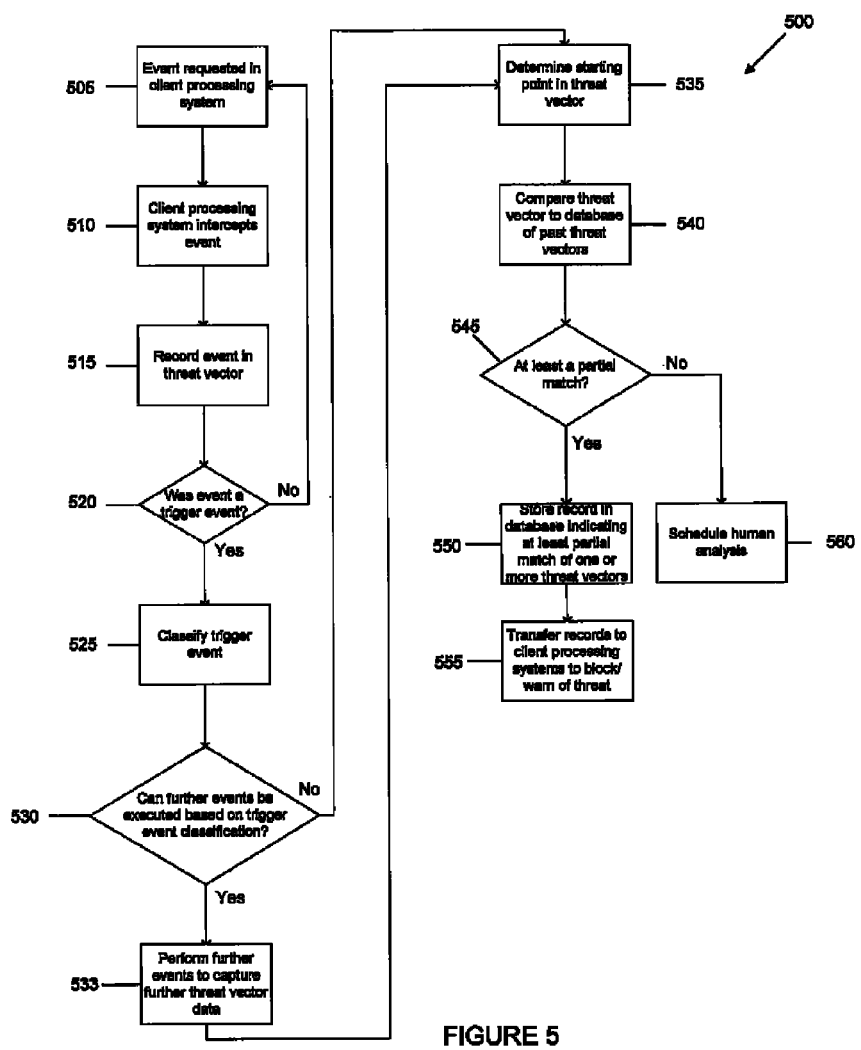
FIG. 5 illustrates a flow diagram illustrating a more detailed example method of capturing data relating to a threat.

Referring to FIG. 5, there is shown a more detailed example of a method of capturing data relating to a threat.

In particular, at step 505, the method 500 includes the processor of the client processing system receiving an instruction requesting that an event be performed by the client processing system. This event may or may not be in response to a user of the client processing system visiting a webpage. This event may be as a result of a user's interaction with the client processing system using the input device. However, in other form, the event may be received remotely from a network or automatically generated by an application stored in the client processing system's memory.

At step 510, the method 500 includes the processor client processing system intercepting the event. The memory of the client processing system may be configured to store hook data to enable the processor of the client processing system to intercept Internet browser API calls and operating system API calls. API interception may be performed as described in FIG. 2.

At step 515, the method 500 includes the processor of the client processing system recording the event in a threat vector which is stored in memory. The threat vector represents one or more chains of events that occur in the client processing system. As will be appreciated, as multiple threads may be executed in the client processing system, a number of chains of events may be recorded by the processor in the threat vector stored in memory. The threat vector can be used to determine whether a detected threat is a variation of a known threat and/or the source of the threat. The threat vector may also store additional information for each event recorded such as the time at which the event occurred or was requested, an IP address which issued the request for the event to occur, data that was input by the user (ie. search terms in a search engine), payloads, and scripts or portions thereof.

At step 520, the method includes the processor determining if the event was a trigger event. Generally, a trigger event is an event which is performed, or is requested to be performed, by the client processing system which is suspicious. In one form, the memory may have stored therein a set of executable rules which when executed by the processor indicate whether the event intercepted in a suspicious event. Generally, the trigger event is indicative of some form of suspicious activity or a function which is generally targeted by threats to compromise a processing system. Examples of trigger events include a file being downloaded, a system change (such as a register key being modified), accessing sensitive data, a memory attack (ie. a heap spray), firing of a known exploit and/or a combination thereof. Other forms of trigger events include the content being used by the client processing system, as will be discussed in more detail later in this document.

In the event that a trigger event has not been detected, the method proceeds back to step 505 to continue recording events in the threat vector in the memory of the client processing system.

In the event that a trigger event has been detected, the method includes, at step 525, the processor of the client processing system classifying the trigger event to determine whether one or more further events can continue to be performed by the client processing system at step 530. In one form, the client processing system includes data stored in memory indicating a level of criticality of the trigger event. The processor queries this data stored in the memory to determine the level of criticality, and based upon the result returned to the processor, the processor decides whether to continue allowing events to execute or to cease any further events being performed. By being able to execute further events prior to a critical malicious event occurring in the client processing system allows additional data to be collected about the potential threat. In the event that the trigger event is classified such that further events can be performed, the method proceeds to step 533. Otherwise, the method proceeds to step 535.

At step 535, the method includes filtering the event history data based upon the trigger event detected by the client processing system. In one form, this filtering step enables the server processing system to disregard events recorded which were performed by the client processing system which were independent of the trigger event. One particular method of filtering the threat vector includes, as exemplified in method 500, the processor analysing the threat vector to determine a starting point in the threat vector. Step 535 may be performed at either the client processing system or potentially at the server processing system. In the event that the determination of the starting point was conducted at the client processing system, the threat vector is subsequently transferred to the server processing system for further analysis.

The starting point can be determined by the processor of the client or server processing system by reverse crawling from the trigger event through the other events recorded in the threat vector. In some forms, common data elements may be shared between one event and another, thereby creating a link in the chain of event. In an additional or alternate form, temporal data stored with each event in the threat vector can be analysed to determine which events were executed automatically by the client processing system and which events were a result of human intervention by the user at the client processing system. Once the processor determines an event which has no logical connection to a previous event, the starting point has been found in the threat vector. The threat vector can then be stored in the memory of the server or client processing system. In the event that the client processing system determines the starting point in the threat vector, the processor of the client processing system transfers data to the server processing system indicative of the starting point for future analysis by the server processing system.

At step 540, the method includes the processor comparing the event history data, in the form of the threat vector, against the past event history data stored in the memory of the server processing system, in the form of the past threat vectors, to determine common events. In one form, the comparison may include a comparison of the order of events in order to determine at least a partial match of a series of events in the threat vector. In particular, the method includes the processor of the server processing system comparing the threat vector to a data stored in memory, generally provided in the form of a database, including past threat vectors received from a plurality of client processing systems in data communication with the server processing system. The database may be part of the server processing system or in data communication with the server processing system. The processor of the server processing system may be configured to detect a partial successful comparison wherein some of the events of the recently received threat vector are in common with a portion of events recorded by one or more past threat vectors received from the plurality of client processing systems. Depending on whether further events were allowed to be performed by the client processing system at step 533, a simulation of the threat may be performed and data recorded using a honeyclient.

At step 545, the method includes determining whether at least a partial match has been identified. In the event that at least a partially successful match is found between the recently received threat vector and one or more past threat vectors, the method includes at step 550 the processor of the server processing system storing a record in the database, wherein the record is indicative of the threat vector and the association between the recently received threat vector and the one or more past threat vectors. This enables a web of related malicious websites or entities to be recorded which can be used to warn or block client processing systems from being exposed to the threat. This process thereby enables a dynamic method of collecting data relating to threats as the method occurs in response to detection of a suspicious event rather than performing mass analysis of a large number of webpages or the like which can be a resource intensive task.

At step 555, the processor of the server processing system can retrieve data from the database and transfer the data to the plurality of client processing systems in order to block and/or warn user's at the respective client processing system that a particular webpage or the like is associated as being a source of a threat. In one particular form, the processor of the server processing system can determine using the information stored in the threat vector to identify one or more disseminating processing systems associated with the common events. In one example, IP addresses or IP ranges could be used to identify one or more disseminating processing systems associated with the common event. Identifiers of the disseminating processing system can then be stored by the processor in the memory of the server processing system in the form of a blacklist. Data can then be transferred by the processor of the server processing system to the client processing systems in order to warn or restrict a series of events being executed by the client processing system.

In the event that at least a partially successful match cannot be found at step 540 and 545 between the recently received threat vector and the plurality of past threat vectors, human analysis is scheduled at step 560 as this may be indicative of detection of a new exploit which has not been detected in the past. In the event that the new exploit is determined to be associated with a threat, hook data is generated to intercept an event associated with the new exploit in order to collect future data about the threat, such as the particular series of disseminating processing systems involved in disseminating the thread.

In one optional form, the threat vector database can be used to detect an infrastructure of threat distribution networks due to the recordal of links between at least partially matching threat vectors. For example, two very different threats may be using a particular processing system to issue a malicious request. This may be indicative of a zombie processing system which authors of malware are using to issue malicious requests.

In another optional form, the processor of the server processing system may compare the occurrence of a particular event against the population of recorded events stored in the database utilising the past threat vectors recorded. In the event that the particular event has a low occurrence rate, and no partial match of common events can also be found, the processor of the server processing system is configured to schedule human analysis of the uncommon event as it is highly likely that the uncommon event is associated with a new exploit for disseminating a thread.

It will be appreciated that software can be installed on a plurality of client processing systems such that the plurality of client processing systems are in data communication with the server processing system in a distributed network infrastructure.

Each client processing system may be configured to store a maximum number of events in the respective threat vector. Once a maximum number of events are being stored in the threat vector, a first-in-first-out schedule is implemented wherein the oldest recorded event is deleted from the threat vector and the newest event is recorded in the new space made available in the threat vector.

In an optional form, one or more graphical representations may be generated representing the relationships between websites and the like which have been detected as posing a threat.

In another optional form, the trigger event classification can be transferred from the client processing system to the server processing system. The server processing system can be used to determine a series of steps to perform in order to capture further data relating to the threat which can be stored in the threat vector. For example, if the trigger event classification is indicative of a social engineering threat, human analysis may be scheduled as it may be necessary for a human to view the threat to identify the cause of the user being exposed to the threat.

In an optional form, detection of the trigger event may not necessarily occur immediately upon interception of one or more events, but rather by interpreting events that occur after one or more suspicious events. For example, in the event a suspicious event occurs in the client processing system, the client processing system may be configured to monitor further events that occur in the client processing system to determine if the suspicious event is a trigger event or not. One technique may be to monitor a certain number of events after the suspicious event. Another technique may be to monitor events during a period of time after the suspicious event(s). Another technique may be to monitor events that occur until a change of context occurs in the client processing system such as an Internet browser displaying content which is from a different domain name compared to the domain name associated with the suspicious event(s). The monitored events are then used by the client processing system to determine if the suspicious event was a trigger event.

In another optional form, many different types of trigger events can be used to detect suspicious activity at the client processing system. In one particular form, entry of credit card details by a user at the client processing system can be utilised as a trigger event. For example, the following rules may be stored as hook data which analyse the event, data stored on the client processing system, and/or data stored in the threat vector database can be used to detect a trigger event:

Entry of credit card details for the first time over the population of collected threat vectors;

Entry of credit card details for a website which is not secure (i.e. no https://)

Entry of credit card details for a website which resolves to an IP address which is from a cluster of IP addresses that have previously been involved with disseminating threats Entry of credit card details for a website which includes unusual content not generally associated with the style of the website Entry of credit card details for the first time at a particular website for the user In another form, trigger event rules provided in the form of hook data could be stored on the memory of the client processing system which when executed by the processor of the client processing system detect the entry of bank account details in similar situations to the credit card trigger event rules outlined above.

It will be appreciated that in some instance, upon a particular trigger event rule being satisfied, the threat vector is analysed in the event that the trigger event is strongly associated with suspicious activity. However, in other instances, trigger events may be weighted to indicate a level of suspiciousness such that once a number of events of varying levels of suspiciousness have been detected, a threshold may be met such that the threat vector can then be analysed.

Continuing with the credit card threat examples discussed above, the recordal of the threat vector can also be used by a financial institution as an indicator of whether credit card fraud, or some other type of financial fraud, has occurred. In this instance, the threat vector can be provided to the financial institution indicating how the fraud occurred, thus providing some form of evidence that the financial customer has suffered financial harm.

In another form, as discussed previously, particular content presented to the user may be analysed at the client processing system which matches suspicious activity associated with a threat. For example, pornographic material, Internet scams, bullying and/or ransom scams commonly use particular phrases or content which can be result in a trigger event being detected by the hook data.

In another optional form, content presented in social networking website can also be monitored to detect a trigger event. For example, if a user of a client processing system uses Twitter™, there might be a spike or change in the user's use or interaction with the social network. In one form, if the user is "followed" using the Twitter application, this may be an unusual activity due to the user's low profile using the social network. This may entice the user to view the follower's website which may include content for compromising the processing system. This type of change in social network activity could be monitored by the client processing system utilising hook data in order to detect a trigger event such that the threat vector could be analysed.

In another optional form, a visual indicator provided in the form of an application plugin for an Internet browser, may be stored at the client processing system which indicates a level of threat depending upon the series or sequence of events performed by the processing system utilising the threat vector data collected at the processing system. For example, if a series of events that are performed by the processing system has been associated with a threat a significant percentage of instances as recorded by the server processing system, the indicator may provide a visual indicator indicative of a level of threat or a probability of threat due to previous historical records collected by the server processing system.

It will be appreciated that whilst the threat vector data records collected by the server processing system are collected in response to a trigger event associated with suspicious activity, the server processing system can collect event history data from the plurality of client processing systems which are not indicative of a threat. This can generate a population of non-suspicious events which can be used in analysis to detect threats, particular new exploits, as uncommon events can be noticed due to the comparison to a larger population.

The above-described method, system, and computer program product may take the form of an entirely hardware embodiment, an entirely software embodiment, firmware, or an embodiment combining software, hardware and/or firmware aspects.

Optional embodiments may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a preferred embodiment has been described in detail, it should be understood that various changes, substitutions, and alterations can be made by one of ordinary skill in the art without departing from the scope of the present invention.

The invention claimed is:

1. A method of capturing data relating to a threat, wherein the method includes, in a server processing system:
    receiving event history data that comprises a sequential chain of one or more events performed by a client processing system, wherein performance of the one or more events in the sequential chain of one or more events leads to a trigger event, and wherein the sequential chain of one or more events is associated with the threat;
    upon detecting the trigger event, suspending performance of one or more further events from the threat, wherein a second chain of events comprises the sequential chain of one or more events and the one or more further events, the one or more further events configured to execute subsequent to the trigger event in the second chain of events;
    receiving the trigger event that occurred in the client processing system, wherein the server processing system receives the event history data in response to the client processing system detecting the trigger event, the trigger event comprising a level of threat, wherein the level of threat includes a value to indicate a probability of the trigger event posing a threat to the client processing system;
    determining whether the level of threat satisfies a predetermined threshold;
    upon determining the level of threat satisfies the predetermined threshold, permitting the one or more further events to be performed by the client processing system subsequent to the occurrence of the trigger event in order to capture additional data regarding the threat;
    analyzing the events in the sequential chain of one or more events in a reverse order to determine a starting point for the sequential chain of one or more events, wherein analyzing the events in the reverse order comprises analyzing the events in the reverse order that the events were added to the sequential chain of one or more events;
    comparing the event history data against past event history data received from a plurality of client processing systems in order to determine if the event history data and the past event history data comprise a series of common events; and
    identifying an entity associated with the series of common events.

2. The method according to claim 1, wherein the method includes, in the server processing system:
    determining, using the series of common events, a series of disseminating processing systems associated with issuing the series of common events for disseminating a threat;
    transferring data indicative of a blacklist to the plurality of client processing systems to restrict events being executed by the plurality of client processing systems which originate from the series of disseminating processing systems.

3. The method of claim 1, wherein the method includes, in the server processing system:
    comparing one or more events recorded in the event history data against one or more events recorded in the past history data to identify an uncommon event associated with event history data, wherein the identification of the uncommon event is indicative of an unknown exploit for compromising one of the client processing systems with the threat; and
    transferring hook data to the plurality of processing systems, wherein the hook data, when executed by the plurality of processing systems, intercepts a request to perform the uncommon event and detects the request to perform the uncommon event as a trigger event.

4. The method of claim 1, wherein the method includes, in the server processing system, filtering the event history data based upon the trigger event detected by the client processing system in order to disregard events recorded which were performed by the client processing system which were independent of the trigger event.

5. The method of claim 1, wherein the starting point of the sequential chain of one or more events is determined when a present event is not logically connected to a previous event.

6. The method of claim 1, further comprising comparing the order of events of the event history data against the order of events of the past event history data received from a plurality of client processing systems to determine if a series of common events exists.

7. The method of claim 1, wherein the entity associated with the series of common events is an Internet Protocol (IP) address.

8. A server processing system configured to capture data relating to a threat, wherein the server processing system comprises:
    a processor;
    memory in electronic communication with the processor; and
    instructions stored in the memory, the instructions being executable by the processor to:
        receive event history data that comprises a sequential chain of one or more events performed by a client processing system, wherein performance of the one or more events in the sequential chain of one or more events leads to a trigger event, and wherein the sequential chain of one or more events is associated with a threat;
        upon detecting the trigger event, suspend performance of one or more further events from the threat, wherein a second chain of events comprises the sequential chain of one or more events and the one or more further events, the one or more further events configured to execute subsequent to the trigger event in the second chain of events;

receive the trigger event that occurred in the client processing system, wherein the server processing system receives the event history data in response to the client processing system detecting the trigger event, the trigger event comprising a level of threat, wherein the level of threat includes a value to indicate a probability of the trigger event posing a threat to the client processing system;

determine whether the level of threat satisfies a predetermined threshold;

upon determining the level of threat satisfies the predetermined threshold, permit the one or more further events to be performed by the client processing system subsequent to the occurrence of the trigger event in order to capture additional data regarding the threat;

analyze the events in the sequential chain of one or more events in a reverse order to determine a starting point for the sequential chain of one or more events, wherein analyzing the events in the reverse order comprises analyzing the events in the reverse order that the events were added to the sequential chain of one or more events;

compare the event history data against past event history data received from a plurality of client processing systems in order to determine if the event history data and the past event history data comprise a series of common events; and identify an entity associated with the series of common events.

9. The server processing system according to claim 8, wherein the instructions are further executable by the processor to:

determine, using the series of common events, a series of disseminating processing systems associated with issuing the series of common events for disseminating a threat;

transferring data indicative of a blacklist to the plurality of client processing systems to restrict events being executed by the plurality of client processing systems which originate from the series of disseminating processing systems.

10. The server processing system of claim 8, wherein the instructions are further executable by the processor to:

compare one or more events recorded in the event history data against one or more events recorded in the past history data to identify an uncommon event associated with event history data, wherein the identification of the uncommon event is indicative of an unknown exploit for compromising one of the client processing systems with the threat; and transfer hook data to the plurality of processing systems, wherein the hook data, when executed by the plurality of processing systems, intercepts a request to perform the uncommon event and detects the request to perform the uncommon event as a trigger event.

11. The server processing system of claim 8, wherein instructions are further executable by the processor to filter the event history data based upon the trigger event detected by the client processing system in order to disregard events recorded which were performed by the client processing system which were independent of the trigger event.

12. The server processing system of claim 8, wherein the starting point of the sequential chain of one or more events is determined when a present event is not logically connected to a previous event.

13. The server processing system of claim 8, wherein the instructions are further executable by the processor to compare the order of events of the event history data against the order of events of the past event history data received from a plurality of client processing systems to determine if a series of common events exists.

14. The server processing system of claim 8, wherein the entity associated with the series of common events is an Internet Protocol (IP) address.

15. A method of capturing data relating to a threat, wherein the method includes, in a client processing system:

recording event history data that comprises a sequential chain of one or more events performed by a client processing system, wherein performance of the one or more events in the sequential chain of one or more events leads to a trigger event, and wherein the sequential chain of one or more events is associated with a threat;

upon detecting the trigger event, suspending performance of one or more further events from the threat, wherein a second chain of events comprises the sequential chain of one or more events and the one or more further events, the one or more further events configured to execute subsequent to the trigger event in the second chain of events;

detecting the trigger event in the client processing system, the trigger event comprising a level of threat, wherein the level of threat includes a value to indicate a probability of the trigger event posing a threat to the client processing system;

determining whether the level of threat satisfies a predetermined threshold;

upon determining the level of threat satisfies the predetermined threshold, performing the one or more further events subsequent to the occurrence of the trigger event based on the level of criticality in order to capture additional data regarding the threat;

analyzing the events in the sequential chain in a reverse order to determine a starting point for the sequential chain of one or more events, wherein analyzing the events in the reverse order comprises analyzing the events in the reverse order that the events were added to the sequential chain of one or more events; and in response to detecting the trigger event, transferring the event history data from the starting point of the chain of events to a server processing system, wherein the server processing system compares the event history data against past event history data received from a plurality of client processing systems in order to determine if the event history data and the past event history data comprise a series of common events, and identifies an entity associated with the series of common events.

16. The method according to claim 15, wherein the method includes, in the client processing system, receiving data indicative of a blacklist from the server processing system in order to restrict events being executed by the client processing system which originate from a series of disseminating processing systems which disseminate a threat.

17. The method according to claim 15, wherein the method includes, in the client processing system, receiving hook data from the server processing system, wherein execution of the hook data by the client processing system configures the client processing system to intercept a request to perform an uncommon event identified by the server processing system as an unknown exploit, wherein the client processing system detects the request to perform the uncommon event as a trigger event using the hook data.

18. The method of claim 15, wherein the starting point of the sequential chain of one or more events is determined when a present event is not logically connected to a previous event.

19. The method of claim 15, wherein the entity associated with the series of common events is an Internet Protocol (IP) address.

20. The method of claim 15, wherein the method includes, in the client processing system, determining whether events subsequent to the trigger event are allowed to be performed.

\* \* \* \* \*